(12) United States Patent
Dewald

(10) Patent No.: US 6,587,159 B1
(45) Date of Patent: Jul. 1, 2003

(54) PROJECTOR FOR DIGITAL CINEMA

(75) Inventor: Duane Scott Dewald, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/311,011

(22) Filed: May 13, 1999

Related U.S. Application Data

(60) Provisional application No. 60/087,156, filed on May 29, 1998.

(51) Int. Cl.[7] .......................... H04N 5/64; G03B 21/14
(52) U.S. Cl. ...................... 348/744; 348/750; 348/756; 353/37
(58) Field of Search ................. 348/750, 751, 348/756, 557, 766, 744, 770, 771, 781, 779; 353/37, 76, 77; 359/669, 839

(56) References Cited

U.S. PATENT DOCUMENTS

| | | | | |
|---|---|---|---|---|
| 3,589,804 A | * | 6/1971 | Taillon et al. .............. 352/140 |
| 3,719,419 A | * | 3/1973 | Davee ........................ 353/101 |
| 4,230,399 A | * | 10/1980 | Moyroud .................... 396/554 |
| 4,668,077 A | * | 5/1987 | Tanaka ........................ 355/30 |
| 4,922,336 A | * | 5/1990 | Morton ........................ 348/51 |
| 5,424,868 A | | 6/1995 | Fielding et al. |
| 5,452,024 A | | 9/1995 | Sampsell |
| 5,583,688 A | | 12/1996 | Hornbeck |
| 5,621,486 A | * | 4/1997 | Doany et al. ............... 348/756 |
| 5,638,142 A | | 6/1997 | Kavanagh et al. |
| 5,704,701 A | | 1/1998 | Kavanagh et al. |
| 5,786,934 A | * | 7/1998 | Chiu et al. .................. 359/494 |
| 5,800,033 A | * | 9/1998 | Funanami et al. ............ 353/97 |
| 5,865,520 A | | 2/1999 | Kavanagh et al. |
| 5,930,050 A | * | 7/1999 | Dewald ....................... 359/670 |
| 5,978,051 A | * | 11/1999 | Gohman et al. ............... 348/66 |
| 6,048,080 A | * | 4/2000 | Belliveau .................... 362/282 |
| 6,120,152 A | * | 9/2000 | Nakayama et al. ........... 353/31 |
| 6,149,276 A | * | 11/2000 | Takeuchi et al. .............. 353/31 |
| 6,176,585 B1 | * | 1/2001 | Koyama et al. ............... 353/31 |
| 6,179,424 B1 | * | 1/2001 | Sawamura .................... 353/33 |
| 6,208,369 B1 | * | 3/2001 | Oren et al. .................. 347/244 |
| 6,231,190 B1 | * | 5/2001 | Dewald ........................ 353/31 |
| 6,243,149 B1 | * | 6/2001 | Swanson et al. .............. 349/62 |
| 6,250,763 B1 | | 6/2001 | Fielding et al. |
| 6,278,801 B1 | | 8/2001 | Boon |
| 6,364,492 B1 | * | 4/2002 | Fujimori et al. ............. 353/119 |
| 6,375,327 B2 | * | 4/2002 | Holman et al. ................ 353/20 |
| 6,394,607 B1 | * | 5/2002 | Hashizume et al. .......... 353/31 |
| RE37,836 E | * | 9/2002 | Fujimori et al. ............. 353/119 |
| 6,445,500 B1 | * | 9/2002 | Itoh ........................... 359/487 |
| 6,486,997 B1 | * | 11/2002 | Bruzzone et al. ........... 359/247 |

* cited by examiner

*Primary Examiner*—John Miller
*Assistant Examiner*—Annan Q. Shang
(74) *Attorney, Agent, or Firm*—Charles A. Brill; Wade James Brady, III; Frederick J. Telecky, Jr.

(57) ABSTRACT

A digital cinema projection system (200) for projecting images onto a display screen. The projection system (200) comprises a lamp console (102) and a projector (202). The projector (202) receives digital image data, processes the digital image data to create an image data stream that is compatible with the chosen spatial light modulator, and uses the processed image data to modulate a beam of light from the lamp console (102). A primary projection lens (204) and lens adapter mounted on a rotatable turret (206) focus the modulated light onto a display screen. Alternatively, an integrated anamorphic projection lens is used to eliminate the need for a separate lens adapter.

31 Claims, 6 Drawing Sheets

PROJECTOR FOR DIGITAL CINEMA

CROSS-REFERENCE TO RELATED INVENTIONS

This application claims priority under 35 USC §119(e)(1) of provisional application No. 60/087,156 filed May 29, 1998.

The following patents and/or commonly assigned patent applications are hereby incorporated herein by reference:

| Patent No. | Filing Date | Issue Date | Title |
|---|---|---|---|
| 5,452,024 | Nov. 1, 1993 | Sept. 19, 1995 | DMD Display System |
| 5,583,688 | Dec. 21, 1993 | Dec. 10, 1996 | Multi-Level Digital Micromirror Device |

FIELD OF THE INVENTION

This invention relates to the field of display systems, more particularly to cinema projection systems using spatial light modulators.

BACKGROUND OF THE INVENTION

For decades the motion picture industry has relied on cellulose-based motion picture film to distribute video information. Motion picture film, however, is not a convenient medium by which to distribute video information. Producing copies of a film is a time consuming process which, while not prohibitively expensive or difficult, is much more expensive than modern alternatives such as manufacturing optical discs. Film is also a relatively heavy medium which, at 25 pounds a canister, represents a significant shipping expense. Film's disadvantages do not end with production and distribution, display of the films requires a trained projectionist to assemble the films with trailers and to operate the projection system. Furthermore, film quickly degrades, often accumulating more than 80% of the lifetime scratches and dirt within the first two days of release.

In addition to all of the physical drawbacks involved with the use of film to distribute motion pictures, there are also significant security concerns involved with the use of film. These security concerns center around the economic structure of the motion picture industry. Motion pictures represent a tremendous investment of capital by the production studios. The production studios rely on a stream of income over an extended period of time to recoup this investment and return a profit. This income stream is fed by admission charges during the initial theatre showings of new releases, and through various other outlets for older motion pictures such as sales of video cassettes and royalties from television broadcasts.

Unlike most industries where there are underlying assets such as factories or secret production methodologies which prevent others from competing directly with the original producers of a product, the motion picture industry releases a product that may be easily and cheaply reproduced, or reused, without the necessity of a large capital investment. These reproductions compete directly with the original copies for audiences and markets—without generating additional revenue for the production studios. To combat the unauthorized distribution of copies of the motion pictures, and to take advantage of the image quality and production advantages of modern digital technology, motion picture studios would like to transition to digital display projectors such as the digital micromirror device (DMD) based projectors.

Although digital projection provides many advantages over the traditional motion picture film production, distribution, and display cycle, theaters have invested a large amount of capital in their current facilities. These existing theatres would like to avoid abandonment of their existing capital investments and minimize the additional capital necessary to transition to the digital projection technology. Therefore, what is needed is a projection system and method that allows the reuse of as much of the existing theater facilities and equipment as possible.

SUMMARY OF THE INVENTION

Objects and advantages will be obvious, and will in part appear hereinafter and will be accomplished by the present invention, which provides a method and system for an optical system for cinema projector. One embodiment of the claimed invention provides projection system comprising a lamp console, a gooseneck attached to the lamp console, and a projector attached to the gooseneck. At least one digital spatial light modulator in the projector selectively modulates light in response to image signals received from a signal processor.

According to another embodiment of the disclosed invention, an image projection system is provided. The image projection system comprises a light source for projecting a beam of light along a light path, and a spatial light modulator and anamorphic lens disposed on the light path. The spatial light modulator, which selectively modulates the beam of light, has a 5:4 aspect ratio while the anamorphic lens has a magnification ratio of 1.5:1.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A digital projector has been developed that is interchangeable with existing film projectors. The new projector provides large venue display capability without the need to either modify existing projection booth facilities or replace or remove lamp consoles. The new projector design allows theaters easily to switch between existing 35 and 70 mm film projectors and the new projector and reduces the training necessary to operate the new projector since projectionists are already familiar with the operation of the existing lamp consoles.

Figure 1:
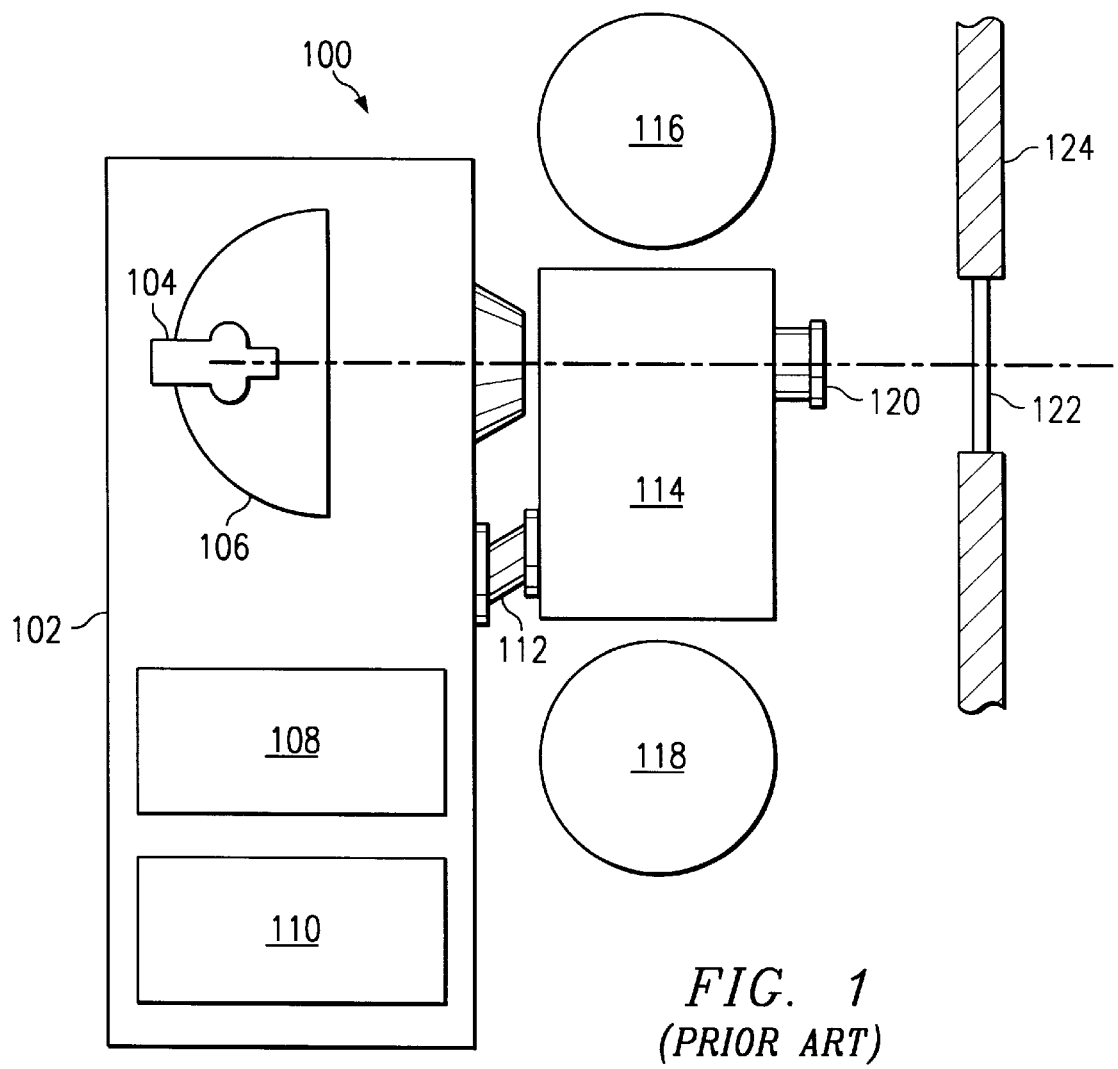
FIG. 1 is a schematic view of a lamp console and film projector of the prior art.

FIG. 1 is a stylized side view of an existing theater projection system 100. In FIG. 1, the existing theater projection system 100 consists of two main portions, a lamp console 102 and an attached film projector 114. The lamp console 102 contains a xenon arc lamp 104 mounted in a reflector 106. The lamp console also houses the power supply 108 for the xenon arc lamp 104. When operating, the xenon lamp 104 produces a lot of heat. To keep the xenon arc lamp 104 as cool as possible, and thus extend the operating life of the xenon arc lamp 104, a cooling system 110 is installed in the lamp console 102. Typically the cooling system 110 is comprised of a fan and appropriate ductwork.

The lamp console 102 produces a high-intensity beam of light which exits the lamp console 102 through an aperture in the side of the lamp console 102. Film projector 114 receives the light exiting the console 102. The film projector 114 includes a supply reel on which a portion of a 35 or 70 mm motion picture is mounted, and a take-up reel 118. The film projector 114 contains motors, lenses, and shutters that chop the light into frame periods. As the motion picture film is drawn through the projector from the supply reel 116 to the take-up reel 118, each frame of the film modulates the light beam for a short duration. The modulated light is then focused on an image plane or viewing screen by the projector's primary lens 120 after passing through a window 122 in the projection room's wall 124.

Figure 2:
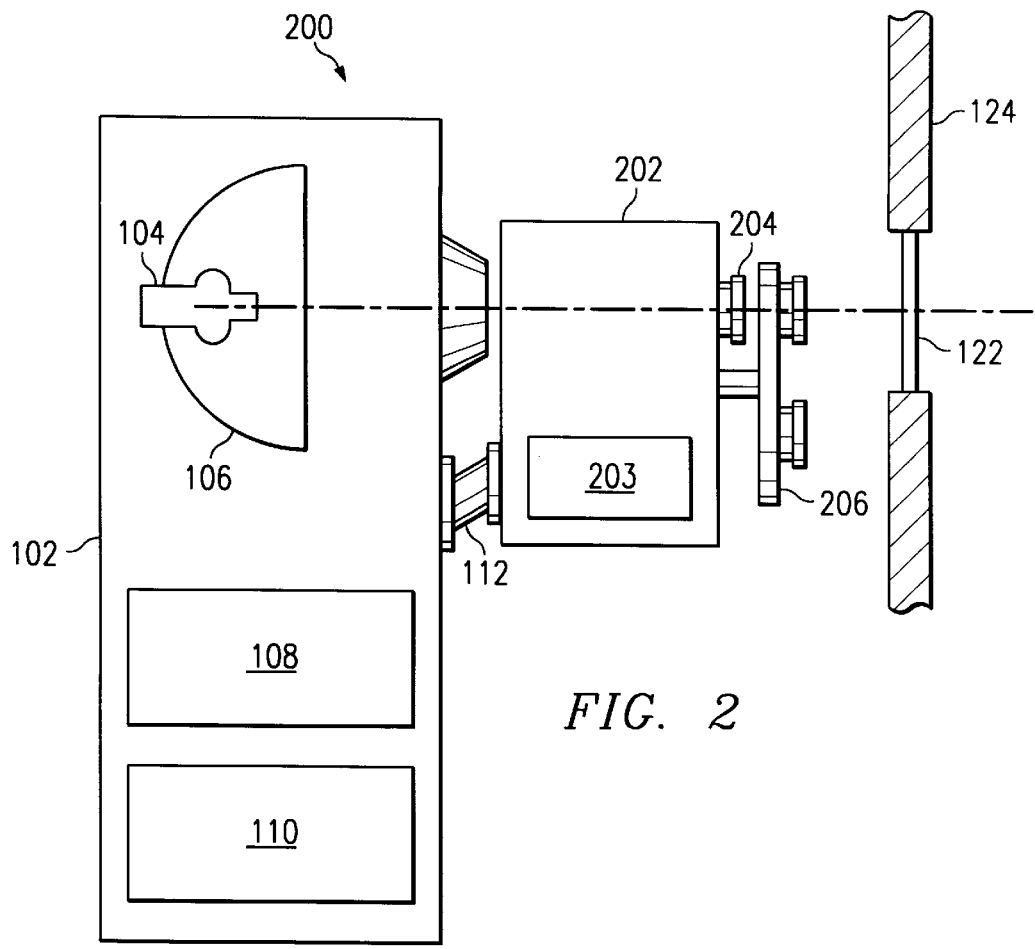
FIG. 2 is a schematic view of a lamp console and a digital projector system according to one embodiment of the present invention.

FIG. 2 is a stylized side view of a digital cinema projection system 200 that adapts a digital projector 202 to the existing lamp console 102. In addition to retaining the existing lamp console 102, the digital projector 202 of FIG. 2 retains the same entrance and exit points, or optical axis, for the light beam from the lamp console 102 and to the projection screen. Furthermore, the digital projector occupies roughly the same volume as existing 35 and 70 mm film projectors 114. The digital cinema projection system 200 is thus able to operate in existing projection booths without modification of the booth or projection windows 122.

Although existing lamp consoles are used without modification, the lamp consoles may be modified to improve their compatibility with DMD-based image projection systems. One improvement is the replacement of the existing reflector 106 with a reflector having an f-number of less than 2.0, preferably an f-number of 1.5.

The new digital projector 202 allows existing theaters to display modern digitally encoded images. The new digital projector 202 is capable of displaying many image formats. A signal processor 203 reformats digital image data to a format that is compatible with the chosen spatial light modulator. For example, if the digital projector 202 uses a digital micromirror device spatial light modulator, the image data will typically need to be converted from a pixel stream format to a bit-plane format.

The new digital projector 202 also retains the film projector's attachment means. Film projectors attach to a fixture called a gooseneck 112. A gooseneck 112 is comprised of two vertical steel plates spaced apart by a steel extension. One end of the gooseneck 112 is bolted to the lamp console 102 while the projector is bolted onto the other end of the gooseneck 112.

Figure 3:
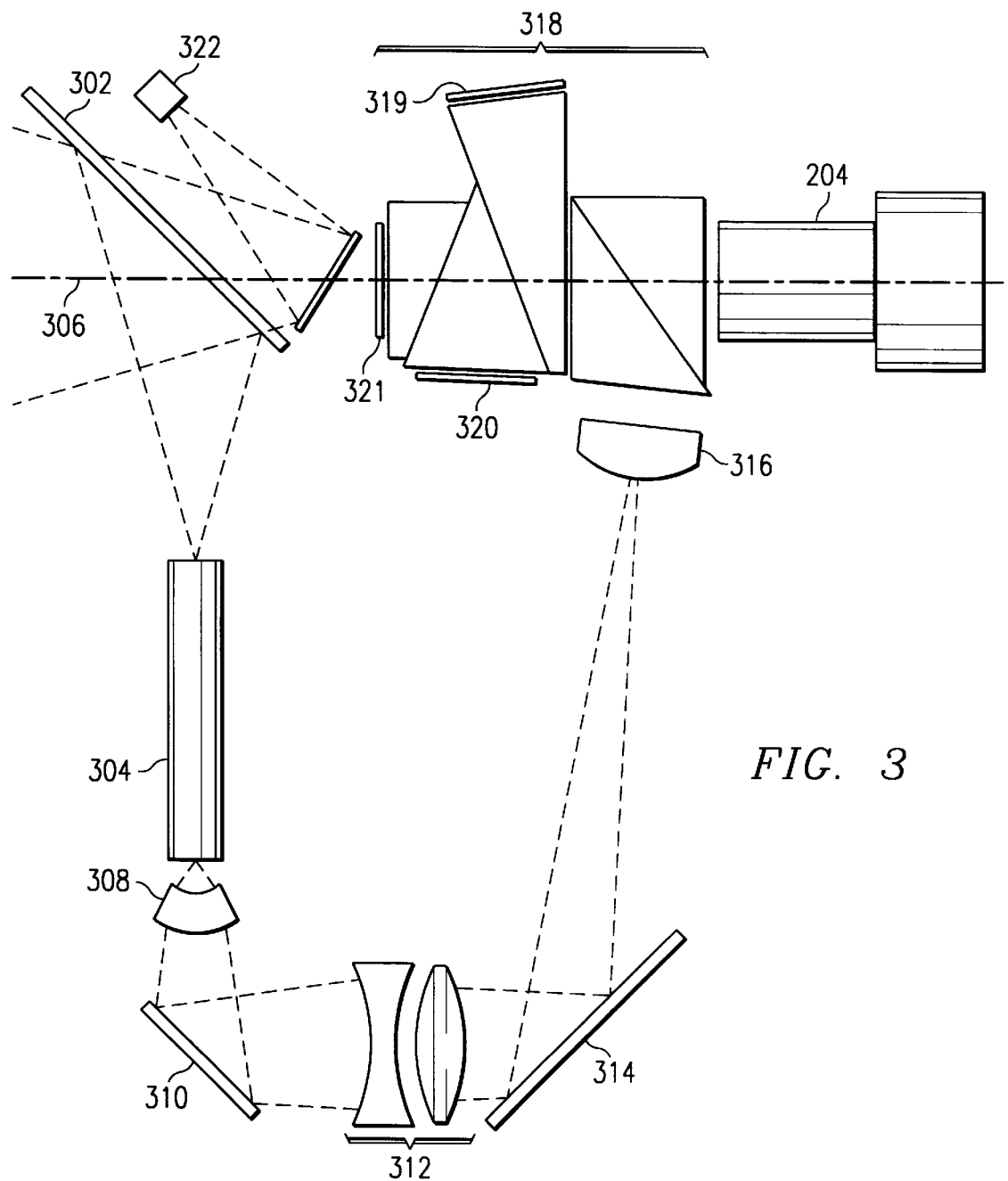
FIG. 3 is a side view of the optical path of the digital projector system of FIG. 2.

As mentioned, a key feature of the design of the digital projector 202 is the retention of the existing optical interfaces. A folded optical path is used to allow the digital projector to fit in existing projection booths and to minimize the length of the projector 202 from the lamp console to the primary lens. FIG. 3 is a schematic view of the components in the optical path of the projector showing the relative locations of the major optical components when DMD's are used as modulators. The optical path shown in FIG. 3 is for purposes of illustration only, and not for purposes of limitation.

As shown in FIG. 3, light entering the digital projector 202 from the lamp console 102 strikes a mirror 302. The mirror 302 allows infrared light to pass while reflecting visible light toward an integrating rod 304. Light passing through the mirror 302 is reflected to an optional focus sensor 322. The optional focus sensor 322 allows the projectionist to peak the light output of the projector while the display screen is still dark.

The mirror 302 not only folds the optical path to reduce the physical size of the digital projector 202 along the primary optical axis 306, it also allows the integrator rod 304 to be positioned vertically. By mounting the integrator rod 304 vertically, the integrator rod 304 will not have a tendency to collect dust particles on the ends of the integrator rod 304. Dust particles on the ends of the integrator rod 304 lower the efficiency of the digital projector 202 and are visible on the image projection screen. While gravity prevents dust particles from settling on the lower exit end of a vertical integrator rod 304, the extremely high temperature present at the entrance of the integrator rod 304 vaporizes organic materials on the upper entrance end of the integrator rod 304 thus preventing dust from accumulating.

The visible light reflected by mirror 302 enters the end of integrating rod 304. The integrating rod 304 is a glass prism designed to internally reflect light entering the integrating rod 304. The internal reflections tend to blend portions of the entering light beam and produce a homogeneous light beam exiting the far end of the integrator rod 304.

After exiting the integrating rod 304, the light beam passes through lens 308 before striking another fold mirror 310. The light beam then passes through a relay lens group 312 and is reflected by yet another fold mirror toward a collector lens 316 and a prism assembly 318. After being modulated by the three spatial light modulators 320, the modulated light beam passes back through the prism assembly 318 and enters the primary projection lens 204. The primary projection lens, which focuses the modulated light beam on an image screen, is positioned on the same optical axis 306 as the beam of light from the lamp console 102.

Figure 4:
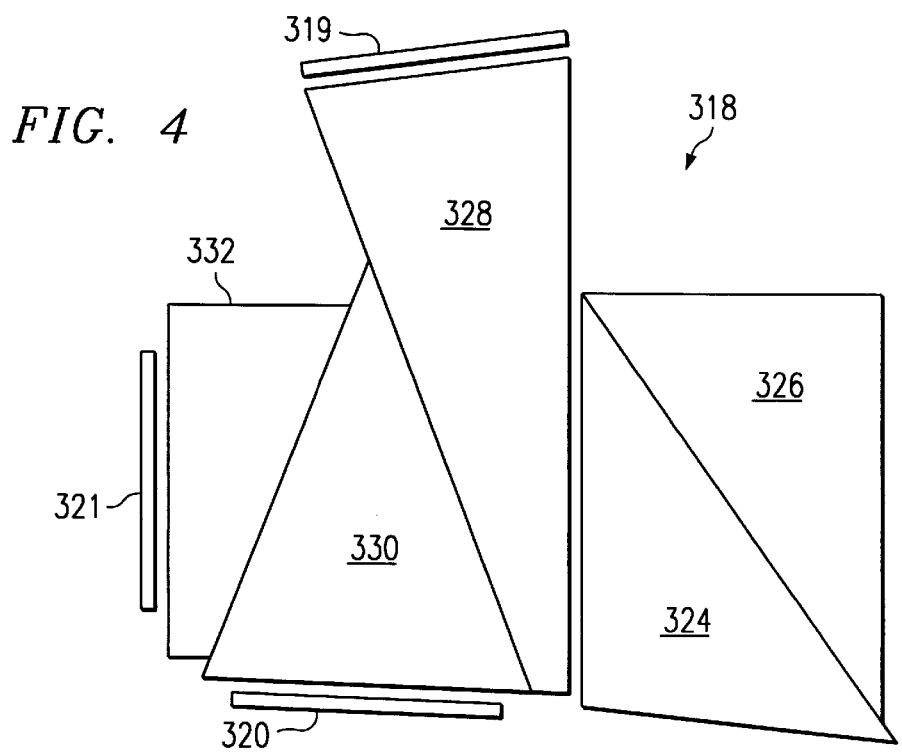
FIG. 4 is a side view of the TIR prism group and color splitter prism group from FIG. 3.

The prism assembly 318, shown in more detail in FIG. 4, typically is comprised of two groups of prisms and three digital spatial light modulators. The first functional prism group encountered by the incident beam of light is the TIR prism group. The TIR prism group acts as a directional beam splitter to provide physical separation between the light beams incident on and reflected by the reflective spatial light modulators. Because the incident and reflected light beams used with typical DMD spatial light modulators are only separated by about 20°, it is advantageous to fold one of the optical paths to separate the incident and reflected light beams and to prevent physical interference between the illumination and projection optics. The TIR prism, by folding only the illumination light path, provides about 90° of separation between the illumination and projection paths.

The TIR prism group is comprised of a TIR prism 324 and a compensation prism 326. Light entering the TIR prism 324 from lens 316 is internally reflected by the interface between the TIR prism 324 and the compensation prism 326. The light exits the TIR prism group and enters the color splitter prism group. After being modulated, the light beam reenters the TIR prism group from the color splitter prism group. The modulated light strikes the interface between the TIR prism 324 and the compensation prism 326 at an angle at which the light passes through the interface to the compensation prism 326 rather than reflecting at the interface. The modulated light continues through the compensation prism 326, which equalizes the optical length for all portions of the light path, and enters the primary projection lens 204.

The color splitter prism group is comprised of three prisms 328, 330, 332, and two dichroic filters deposited on prism faces. White light entering the color splitter prism group is split into three component color light beams by selective reflection using the dichroic filters. For example, as the white light passes through a first color splitter prism 328, a first color component is reflected by a dichroic filter at the interface between the first color splitter prism 328 and a second color splitter prism 330. The reflected first color component light beam travels through the first color splitter prism 328 to a first spatial light modulator 319. The first spatial light modulator 319 selectively reflects portions of the first color component light beam to form a first single color image bearing light beam.

The two color components of the white light beam which were not reflected by the first dichroic filter cross the interface between the first color splitter prism 328 and the second color splitter prism 330, and pass through the second color splitter prism 330. A second dichroic filter at the interface between the second color splitter prism 330 and a third color splitter prism reflects a second single color component light beam through the second color splitter prism 330 to a second spatial light modulator 320. The second spatial light modulator 320 selectively reflects portions of the second color component light beam to form a second single color image bearing light beam.

The remaining portion of the white light beam passes through the third color splitter prism to the third spatial light modulator 321. The third spatial light modulator 321 selectively reflects portions of the third color component light beam to form a third single color image bearing light beam.

After the three single component light beams are modulated by the spatial light modulators, they retrace their paths through the color splitter prism group where they are recombined, and reenter the TIR prism group. As mentioned above, they pass through the TIR prism group and enter the primary projection lens 204.

The use of a TIR prism assembly requires the projection lens to operate with the chief rays telecentric at the spatial light modulator in order to maximize the light throughput without compromising the function of the TIR prism. Additionally, the primary projection lens 204 must have a relatively long back focal length in order to be compatible with the TIR and color splitter prism assemblies. Furthermore, the primary projection lens 204 must have a large enough format to be able to image a 1280×1024 (SXGA) micromirror array—a 28 mm diagonal assuming the micromirrors are on 17 μm centers. These requirements require a relatively complex, and therefore expensive, primary projection lens.

The location of the primary projection lens 204 is also critical. Typical projection lenses used with micromirror devices have a very short depth of field in object space. Since the back focal distance is fixed, these primary projection lenses typically must be positioned within a 20 micron tolerance.

An additional lens requirement is a result of the various media formats in use. Most theaters project media in both "Academy," also known as "flat," format, as well as media in a "Cinemascope" format. Academy media, which uses a 1.85:1 aspect ratio, and Cinemascope media, which uses a 2.35:1 aspect ratio, will each require anamorphic lens elements in order to use the full SXGA micromirror array, which has a 1.25:1 aspect ratio. Furthermore, it is desirable for theaters to be able to project computer generated images using the 1.25:1 aspect ratio.

To avoid having to purchase three separate primary lenses, and to avoid the focus and boresight problems associated with interchangeable lenses, a fixed primary projection lens 204 coupled with afocal anamorphic and spherical adapters is used. An anamorphic lens adapter can be used with any media format. In general, the anamorphic ratio of the lens adapter is equal to the media aspect ratio divided by the device aspect ratio.

Preferably, the lens adapters are mounted on a moveable turret 206. Mounting primary projection lenses on the turret 206 is difficult due to the close proximity between the primary projection lens 204 and the TIR prism group and the precise alignment required. The afocal anamorphic and spherical adapters, however, are very insensitive to position errors—thus simplifying the use of a motorized turret.

Figure 5:
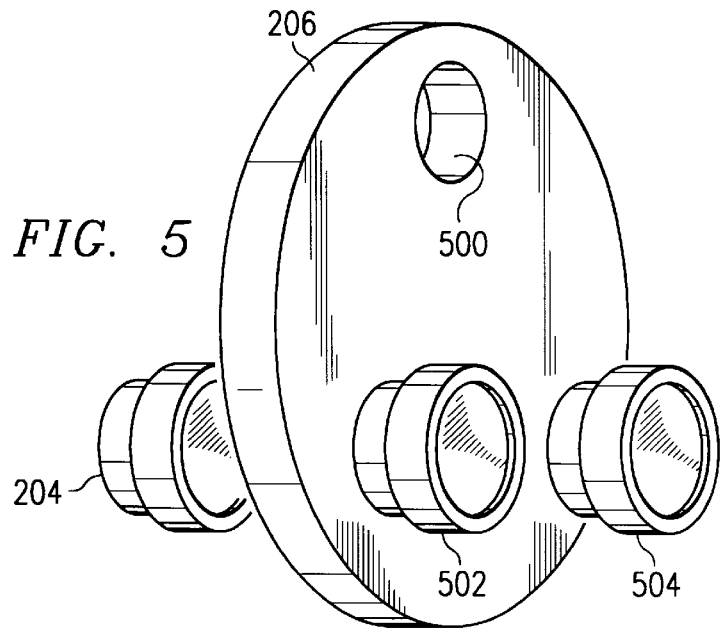
FIG. 5 is a perspective view of a lens adapter turret and primary projection lens from the digital projector of FIG. 2.

A typical lens adapter turret 206 is shown in FIG. 5. The lens adapter turret 206 in FIG. 5 has three positions. When the lens adapter turret 206 is rotated to a first position, an aperture 500 is aligned with the primary projection lens 204. The aperture position allows the display of a 1.25:1 image and is used when displaying computer-generated graphics.

When the lens adapter turret 206 is rotated to a second position, as shown in FIG. 5, a 1.5× anamorphic lens 502—a lens having a 1.5× horizontal focal length reduction—is positioned in front of the primary projection lens. The 1.5× anamorphic lens adapter 502 allows the 1.25:1 micromirror array to fill an Academy screen with an Academy (1.85:1) image. Projecting an Academy image on a Cinemascope (2.35:1) screen requires a mask, such as the screen's curtains, to be used on the sides of the screen.

The 1.25:1 micromirror array is also capable of projecting a Cinemascope (2.35:1) image onto an Academy (1.87:1) screen. To project the wide format image on the standard width screen, only the center rows of micromirror elements are used. For example, only the center 803 rows of a 1280×1024 element micromirror array are used, in conjunction with the primary projection lens and 1.5× anamorphic lens adapter 502, to project a Cinemascope image onto an Academy screen. While using the center rows of the spatial light modulator is preferred, any portion of the spatial light modulator, or the entire spatial light modulator given an appropriate adapter, can be used. When a Cinemascope image is projected onto the Academy screen, the top and bottom portions of the screen are masked. Existing theater screens are often sized such that all four sides of the screen are masked, regardless of the image format being projected.

A third position of the lens adapter turret 206 places a lens adapter 504 with 1.5× anamorphic and 1.25× spherical power in front of the primary projection lens 204. Lens adapter 504 is used to project Cinemascope (2.35:1) images onto a Cinemascope screen. As discussed above, typically only the center rows of the micromirror device are used to project a Cinemascope image.

Figure 6:
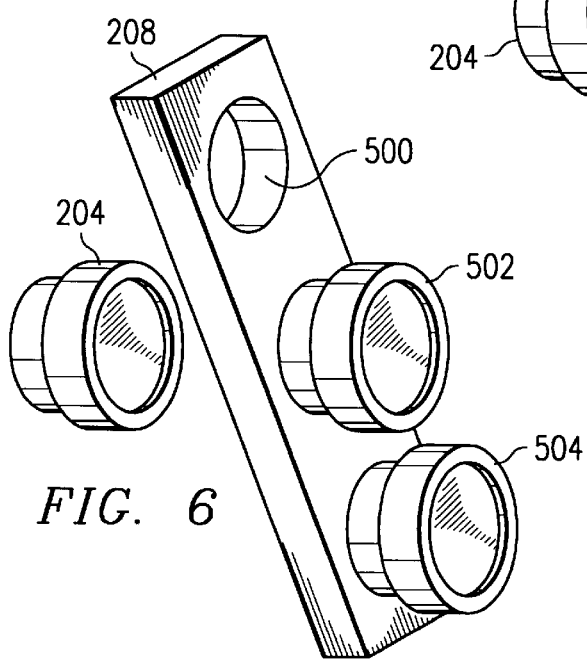
FIG. 6 is a perspective view of a linear lens adapter turret and primary projection lens from the digital projector of FIG. 2.

FIG. 6 shows an alternate turret configuration. The linear turret 208 shown in FIG. 6 performs the same function as the round turret 206 of FIG. 5. Rather than rotate to align the aperture 500 or either of the adapter lenses 502, 504 with the primary projection lens 204, the linear turret 208 slides from one position to the next. The turrets shown in FIGS. 5 and 6 are merely examples of the possible turret designs available.

Figure 7:
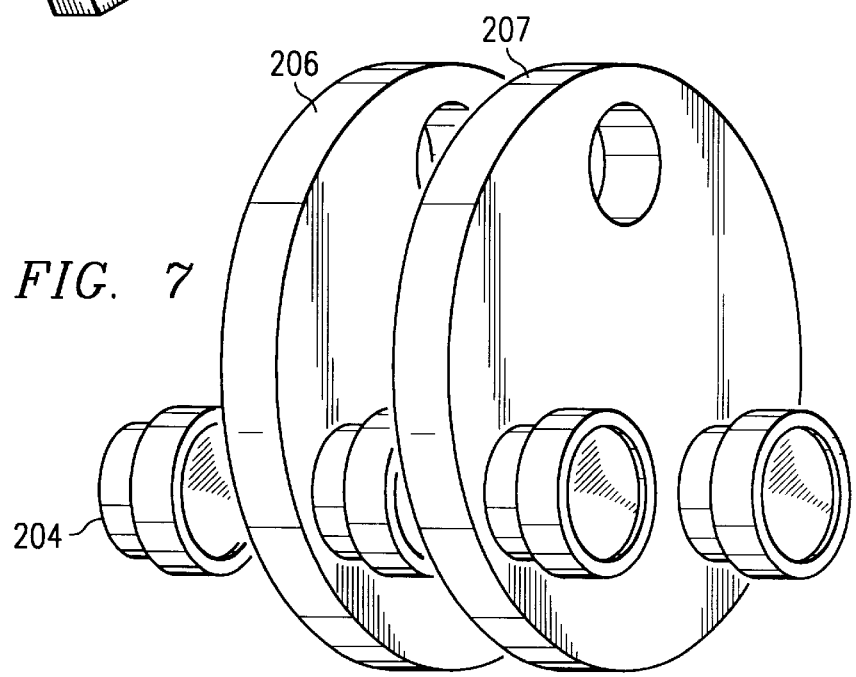
FIG. 7 is a perspective view of a dual lens adapter turret and primary projection lens similar to the single lens adapter turret of FIG. 5.

An alternative to the single primary projection lens 204 in combination with a single lens adapter discussed above is the use of a combination of separate lens adapters. In FIG. 7, separate adapters are carried on two separate turrets 206, 207 to allow various combinations of the lens adapters on the two turrets. One embodiment of a projector using separate lens adapters uses an anamorphic lens adapter having a 1.5× horizontal focal length reduction in combination with an anamorphic lens adapter having a 0.8× vertical focal length reduction. This combination allows all 1024 rows of micromirror elements to be used to project a Cinemascope (2.35:1) image onto an Academy (1.87:1) screen. As in the prior examples, the top and bottom of the screen are masked. Rotating the 0.8× anamorphic lens adapter out of the projection path allows the projector to display an Academy image on a Cinemascope screen. Substituting a 1.9× anamorphic lens adapter for the 1.5× anamorphic lens adapter allows the projector to display a Cinemascope image on a Cinemascope screen.

Although not shown, alternate projector embodiments utilize dual linear turrets 208 in place of the dual circular turrets 206, 207, shown in FIG. 7. Alternatively, one or more linear turrets 208 are combined with one or more round turrets 206.

The prior discussion was predicated on the assumption that the digital projector would be required to project computer generated graphics without anamorphic magnification at least part of the time. Digital projectors that are not required to project undistorted images have the anamorphic magnification built into the primary projection lens 204. Combining the functions of an anamorphic lens adapter and the primary projection lens 204 is less expensive than providing two separate lenses.

Integrated projection lenses, lenses which perform both the projection and anamorphic magnification functions, are preferred in instances where unreasonably large anamorphic adapters are required. For example, using a DMD spatial light modulator typically requires the use of a TIR illumination prism. As mentioned above, the TIR prism requires the projection lens to operate with the chief rays telecentric in object space. Telecentric lenses have a relatively large lens diameter, which drives up the cost of the lens. A large projection lens also requires a large anamorphic adapter. An anamorphic adapter for a typical DMD-based cinematic projector must be approximately 8 inches in diameter—too large to be practical. Therefore, a DMD-based cinematic projector will typically use one or more integrated projection lenses instead of a single projection lens in combination with several anamorphic adapters.

Figure 8:
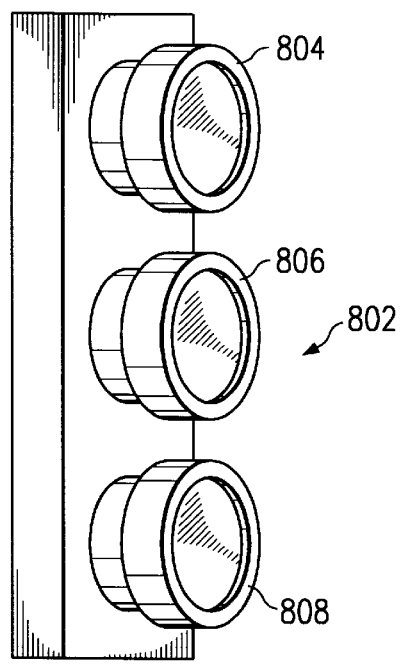
FIG. 8 is a perspective view of a linear lens turret holding integrated projection lenses.
Figure 9:
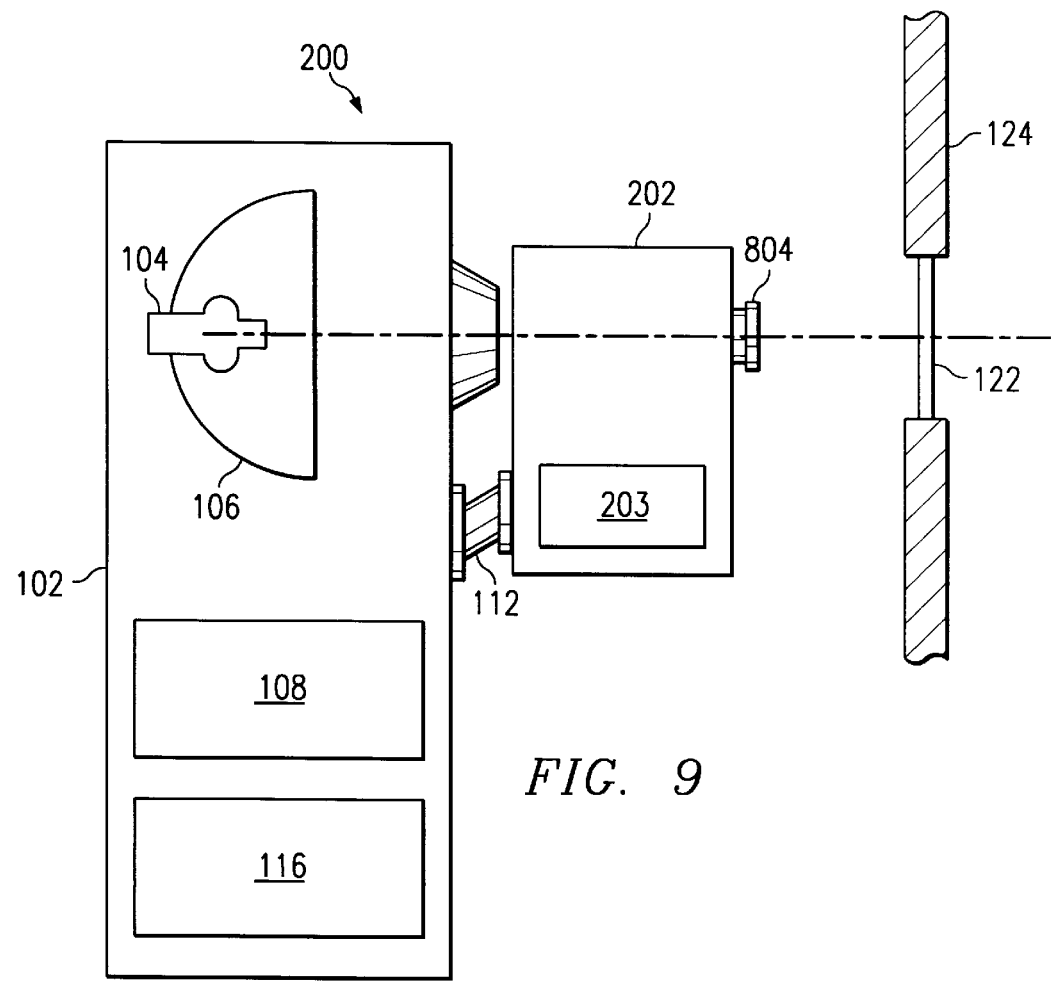
FIG. 9 is a schematic view of the lamp console and digital projector system of FIG. 2 using a single integrated lens according to one embodiment of the present invention.

As described above in relation to separate anamorphic adapters, integrated lenses are either individually mounted on the projector when needed, or they are mounted on a turret to allow the desired lens easily to be positioned along the optical axis. FIG. 8 depicts a linear turret 802 for a typical DMD-based projector using integrated projection lenses. Linear turret 802 holds three integrated projection lenses 804, 806 and 808. Two of the lenses, 804, 806 provide anamorphic magnification to allow projection of either Academy or Cinemascope media. The third lens 808 is spherical to allow undistorted projection of computer generated images. As with the above examples, a projector may be equipped with a greater or lesser number of lenses depending on the media formats it must project. FIG. 9 shows the projector of FIG. 2 using a single integrated lens 804.

Figure 10:
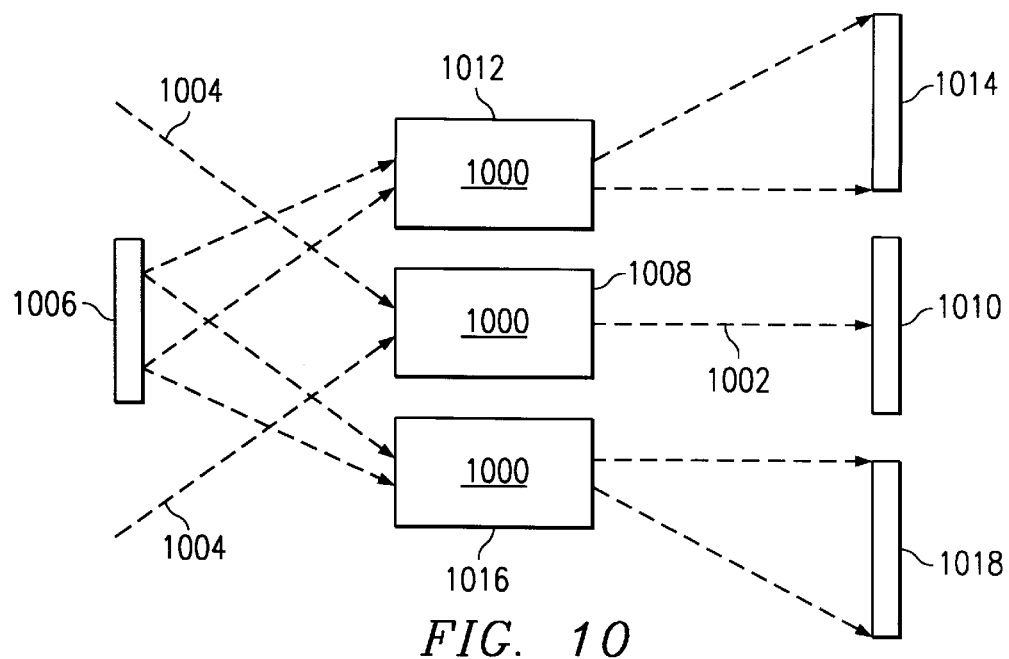
FIG. 10 is a simplified pictorial representation of offset projection in a display system having greatly exaggerated offset angles.

Although telecentric lenses tend to be larger, and therefore more expensive than non-telecentric lenses, they have the additional advantage of providing good offset projection performance. FIG. 10 is a simplified pictorial representation of offset projection in a display system having greatly exaggerated offset angles. Offset projection occurs when the object format diameter of the projection lens 1000, the largest object the projection lens 1000 is capable of imaging, is larger than the actual object being imaged and the object being imaged is not located on the lens axis 1002. For example, projection lens 1000 has a field of view, as shown by rays 1004, which at the object plane defines an object format diameter much larger than the object being imaged. When the projection lens 1000 is in position 1008, the image of modulator 1006 is projected by projection lens 1000 onto the image plane at location 1010. If the projection lens 1000 is moved upward in relation to modulator 1006 to position 1012, the image of the modulator 1006 is shifted, or offset, across the image plane to location 1014. Likewise, if the projection lens 1000 is moved downward in relation to modulator 1006 to position 1016, the image of the modulator 1006 is shifted, or offset, across the image plane to location 1018. In FIG. 10, the field of view shown by rays 1004 is approximately four times as large as the modulator 1006 being imaged. In practice, a lens with 400% offset is too expensive for most applications and the maximum offset is limited to 200% or less, typically 150%.

Figure 11:
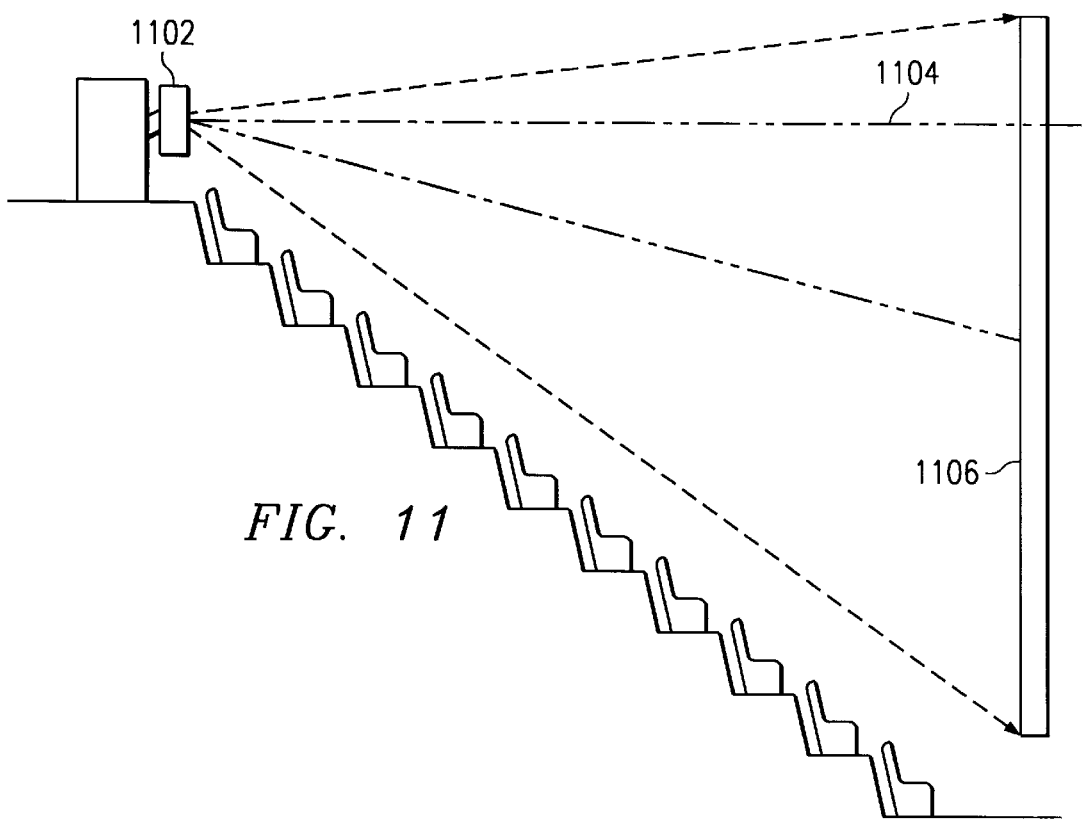
FIG. 11 is a side view of an offset projection system used in a theater having stadium style seating.

Offset projection can be used to prevent image keystoning when the image projector is not at the same elevation as the center of the projection screen—exactly the situation presented by modern theaters with stadium seating. As shown in FIG. 11, when an on-axis projection system is positioned in the upper rear of a modern theater with stadium seating, the projector must be angled downward toward the center of a wall mounted projection screen. This angle can be as large as 15°, resulting in the bottom of the image being wider than the top. If an offset projection system 1102 is used, the optical axis 1104 of the projector 1102 remains perpendicular, or nearly perpendicular, to the screen 1106 eliminating objectionable keystoning.

In addition to enabling a cost-effective switchover from traditional film media to modern digital image storage and processing, the digital projector taught herein is easily upgradeable as digital image projection technology improves. For example, higher resolution spatial light modulators and control circuitry may be utilized without losing the investment in lenses. To continue using the existing lenses, the new spatial light modulators need only retain the existing aspect ratio and format size. New spatial light modulators, such as a 1600×1280 micromirror array, can maintain the existing aspect ratio and format size by shrinking the size of the individual micromirror elements. For instance, a 1600×1280 spatial light modulator array using 13.6 μm elements is approximately the same size as a 1280×1020 spatial light modulator array which has 17 μm elements.

Thus, although there has been disclosed to this point a particular embodiment for a projector for digital cinema and method thereof, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. An optical projection system comprising:
   a lamp console, said lamp console comprising a lamp reflector and a lamp in said reflector, said lamp console for emitting a beam of light along a light path through an aperture in said console; and
   a projector disposed on said light path, said projector for selectively modulating said beam of light in response to an image signal, said projector comprising:
      a signal processor for receiving said image signal and formatting said image signal;
      at least one spatial light modulator for receiving said formatted image signal and said beam of light, said at least one spatial light modulator for selectively reflecting portions of said beam of light along a projection light path in response to said formatted image signal;
      optics for directing said beam of light onto said at least one spatial light modulator; and
      a primary lens for focusing light in said projection light path onto an image plane.

2. The optical system of claim 1 wherein said at least one spatial light modulator is at least one digital micromirror device.

3. The optical system of claim 1 wherein said at least one spatial light modulator is three digital micromirror devices.

4. The optical system of claim 1 further comprising a lens turret disposed in said projection light path.

5. The optical system of claim 4, said lens turret comprising:
   a lens holder; and
   at least two apertures in said lens holder, said lens holder operable to position each of said at least two apertures in said projection light path.

6. The optical system of claim 4, said lens turret comprising:
   a lens holder;
   at least two turret apertures in said lens holder, said lens holder operable to position each of said at least two turret apertures in said projection light path; and
   a spherical lens in at least one of said turret apertures.

7. The optical system of claim 4, said lens turret comprising:
   a lens holder;
   at least two turret apertures in said lens holder, said lens holder operable to position each of said at least two turret apertures in said projection light path; and
   an anamorphic lens in at least one of said turret apertures.

8. The optical system of claim 1, such that the primary lens axis is parallel to the symmetric axis of the lamp and reflector.

9. The optical system of claim 1, such that the primary lens axis is colinear with the symmetric axis of the lamp and reflector.

10. An image projection system comprising:
   a light source for projecting a beam of light along a light path;
   a spatial light modulator disposed on said light path, said spatial light modulator having a 5:4 aspect ratio and selectively modulating said beam of light; and
   an anamorphic lens disposed on said light path, said anamorphic lens having a magnification ratio of 1.5:1.

11. The image projection system of claim 10, said spatial light modulator comprising a digital micromirror device.

12. The image projection system of claim 10, said anamorphic lens positioned to provide offset projection of said beam of selectively modulated light.

13. An optical system for selectively modulating a beam of light in response to an image signal, said optical system comprising:
   optics for receiving said beam of light directed along a first path and directing said beam of light onto said at least one spatial light modulator, said optics comprising:
      an integrator receiving light from said mirror;
      relay optics receiving light from said integrator; and
      a prism assembly receiving light from said relay optics and for splitting said beam of light into three monochromatic beams of light;
   a signal processor for receiving said image signal and formatting said image signal;
   at least one spatial light modulator for receiving said formatted image signal and said beam of light, said at least one spatial light modulator for selectively reflecting portions of said beam of light along a projection light path in response to said formatted image signal; and
   a primary lens for focusing light in said projection light path onto an image plane, said projection light path parallel to said first path.

14. The optical system of claim 13, said projection light path colinear with said first path.

15. The optical system of claim 13, said projection light path parallel with said first path.

16. The optical system of claim 13, wherein said at least one spatial light modulator is at least one digital micromirror device.

17. The optical system of claim 13, wherein said at least one spatial light modulator is three digital micromirror devices.

18. The optical system of claim 13, further comprising a lens turret disposed in said projection light path.

19. The optical system of claim 18, said lens turret comprising:
   a lens holder; and
   at least two apertures in said lens holder, said lens holder operable to position each of said at least two apertures in said projection light path.

20. The optical system of claim 18, said lens turret comprising:
   a lens holder;
   at least two turret apertures in said lens holder, said lens holder operable to position each of said at least two turret apertures in said projection light path; and
   a spherical lens in at least one of said turret apertures.

21. The optical system of claim 18, said lens turret comprising:
   a lens holder;
   at least two turret apertures in said lens holder, said lens holder operable to position each of said at least two turret apertures in said projection light path; and
   an anamorphic lens in at least one of said turret apertures.

22. The optical system of claim 13, said optics comprising:
   a mirror receiving said light beam from said lamp and directing said light beam to said integrator.

23. The optical system of claim 1, wherein said primary lens is fixed relative to said optical system, said optical system comprising:
- a lens turret disposed in said projection light path, said lens turret comprising:
  - a lens holder;
  - at least two turret apertures in said lens holder, said lens holder operable to position each of said at least two turret apertures in said projection light path; and
  - a spherical lens in at least one of said turret apertures.

24. The optical system of claim 1, wherein said primary lens is fixed relative to said optical system, said optical system comprising:
- a lens turret disposed in said projection light path, said lens turret comprising:
  - a lens holder;
  - at least two turret apertures in said lens holder, said lens holder operable to position each of said at least two turret apertures in said projection light path; and
  - an anamorphic lens in at least one of said turret apertures.

25. The optical system of claim 13, wherein said primary lens is fixed relative to said optical system, said optical system comprising:
- a lens turret disposed in said projection light path, said lens turret comprising:
  - a lens holder;
  - at least two turret apertures in said lens holder, said lens holder operable to position each of said at least two turret apertures in said projection light path; and
  - a spherical lens in at least one of said turret apertures.

26. The optical system of claim 13, wherein said primary lens is fixed relative to said optical system, said optical system comprising:
- a lens turret disposed in said projection light path, said lens turret comprising:
  - a lens holder;
  - at least two turret apertures in said lens holder, said lens holder operable to position each of said at least two turret apertures in said projection light path; and
  - an anamorphic lens in at least one of said turret apertures.

27. An optical system comprising:
- a lamp console, said lamp console comprising a lamp reflector and a lamp in said reflector, said lamp console for emitting a beam of light along a light path through an aperture in said console; and
- a projector disposed on said light path, said projector for selectively modulating said beam of light in response to an image signal, said projector comprising:
  - a signal processor for receiving said image signal and formatting said image signal;
  - at least one spatial light modulator for receiving said formatted image signal and said beam of light, said at least one spatial light modulator for selectively reflecting portions of said beam of light along a projection light path in response to said formatted image signal;
  - optics for directing said beam of light onto said at least one spatial light modulator, said optics comprising:
    - an integrator in said light path for receiving light from said mirror;
    - relay optics in said light path for receiving light from said integrator; and
    - a prism assembly in said light path for receiving light from said relay optics and for splitting said beam of light into three monochromatic beams of light; and
  - a primary lens for focusing light in said projection light path onto an image plane.

28. The optical system of claim 27, comprising:
- a lens turret disposed in said projection light path, said lens turret comprising:
  - a lens holder;
  - at least two turret apertures in said lens holder, said lens holder operable to position each of said at least two turret apertures in said projection light path; and
  - a spherical lens in at least one of said turret apertures.

29. The optical system of claim 27, comprising:
- a lens turret disposed in said projection light path, said lens turret comprising:
  - a lens holder;
  - at least two turret apertures in said lens holder, said lens holder operable to position each of said at least two turret apertures in said projection light path; and
  - an anamorphic lens in at least one of said turret apertures.

30. The optical system of claim 27, wherein said primary lens is fixed relative to said optical system, comprising:
- a lens turret disposed in said projection light path, said lens turret comprising:
  - a lens holder;
  - at least two turret apertures in said lens holder, said lens holder operable to position each of said at least two turret apertures in said projection light path; and
  - a spherical lens in at least one of said turret apertures.

31. The optical system of claim 27, wherein said primary lens is fixed relative to said optical system, comprising:
- a lens turret disposed in said projection light path, said lens turret comprising:
  - a lens holder;
  - at least two turret apertures in said lens holder, said lens holder operable to position each of said at least two turret apertures in said projection light path; and
  - an anamorphic lens in at least one of said turret apertures.

* * * * *